Figure 1:
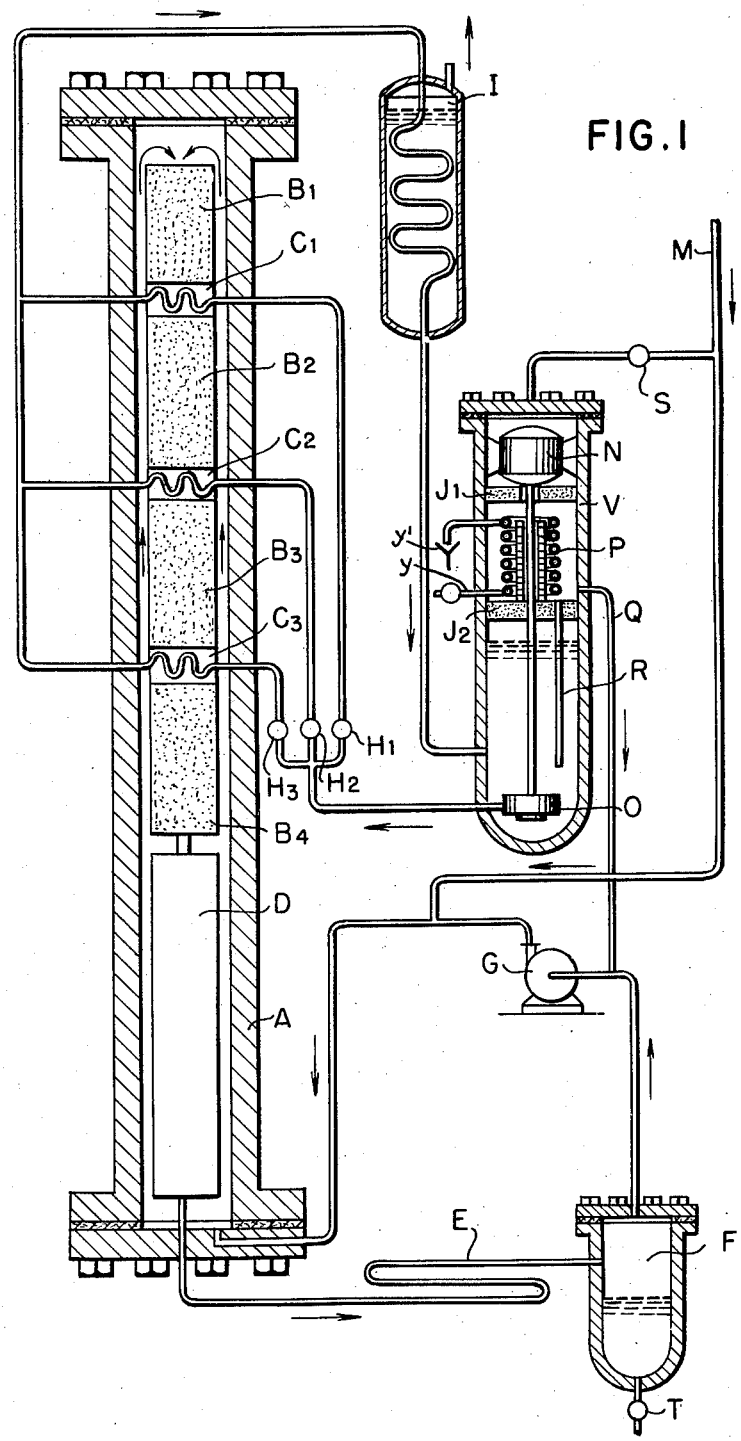

Aug. 4, 1959  G. FAUSER  2,898,183
PROCESS AND APPARATUS FOR PERFORMING EXOTHERMIC
REACTIONS UNDER HIGH PRESSURE AND AT
ELEVATED TEMPERATURE
Filed March 9, 1955  2 Sheets-Sheet 1

Aug. 4, 1959 G. FAUSER 2,898,183
PROCESS AND APPARATUS FOR PERFORMING EXOTHERMIC
REACTIONS UNDER HIGH PRESSURE AND AT
ELEVATED TEMPERATURE
Filed March 9, 1955 2 Sheets-Sheet 2

United States Patent Office 2,898,183
Patented Aug. 4, 1959

2,898,183

PROCESS AND APPARATUS FOR PERFORMING EXOTHERMIC REACTIONS UNDER HIGH PRESSURE AND AT ELEVATED TEMPERATURE

Giacomo Fauser, Novara, Italy, assignor to Montecatini, Societa Generale per l'Industria Mineraria e Chimica, a corporation of Italy Application March 9, 1955, Serial No. 493,190

Claims priority, application Italy August 27, 1951

17 Claims. (Cl. 23—1)

My invention relates to a process and apparatus for performing exothermic reactions under high pressure and at elevated temperature, and is hereinafter disclosed and claimed as a continuation-in-part of my copending application Serial No. 301,775, filed July 30, 1952, now abandoned.

It is known that for attaining a high yield of combination from exothermic reactions carried out at high pressure, such as ammonia synthesis and methanol synthesis, the temperature of the catalyst must be kept within defined limits. Hence it is necessary to carefully eliminate the heat evolving from the reaction. This is particularly so with reactions, such as the synthesis of methyl alcohol from hydrogen and carbon monoxide, in which an excessive temperature of the catalyst, aside from reducing yield, also increases the danger of producing undesired combinations, for instance methane and carbon dioxide. Since these reactions are more exothermic than that originating methanol, a dangerous increase in temperature may result which accelerates the parasitic reactions spoiling the catalyst mass and also the catalysis furnace.

In order to eliminate the heat of reaction in exothermic synthesis under pressure, various types of heat exchangers have been placed into the catalyst mass for preheating the cold gases being supplied to the reaction. With such devices, however, it is difficult to obtain the desired gradient of temperature, and most of the reaction heat is dissipated as a complete loss into coolants at the exit of the synthesis furnace.

It has been proposed, therefore, to divide the catalyst mass into a number of layers, and to insert in the intermediate spaces coiled pipes of stainless steel traversed by cooling water. In this way the heat of reaction can be utilized for producing steam.

However, the construction of the coils to operate inside the synthesis columns at a pressure of several hundreds of atmospheres and at temperatures that may attain 600° C., involves great difficulties. At such temperatures the resistance of steel is reduced considerably and, even if steels with high percentages of chromium and nickel are used, the pipes must be given an excessive wall thickness. The construction and operation of such apparatus, therefore, becomes highly uneconomical at pressures above 250–300 atm. and virtually impossible if the pressure exceeds 350–400 atm.

It is an object of my invention to overcome these difficulties and to reduce to a minimum the wall thickness of the pipes for circulating the cooling water, thus providing for economical operation even if the process is carried out at pressures far above those mentioned and even as high as 800 to 1000 atm.

To this end, and in accordance with a feature of my invention, I apply the pressure obtaining in the reaction chamber to the coolant circulating through the heat exchanger pipes, so that the coolant pressure within the pipes is always substantially the same as the pressure in the reaction chamber to which these pipes are subjected.

According to another feature of the invention, the pressure equalizing connection is made through a coolant collecting vesesl which is cooled to prevent vaporous coolant or steam from penetrating into the synthesis circuit.

According to still another feature of my invention, a further improvement and simplification is achieved by including the heat exchangers in the reaction chamber into a thermosiphon system in which water, acting as the coolant, is kept in circulation.

Figure 2:
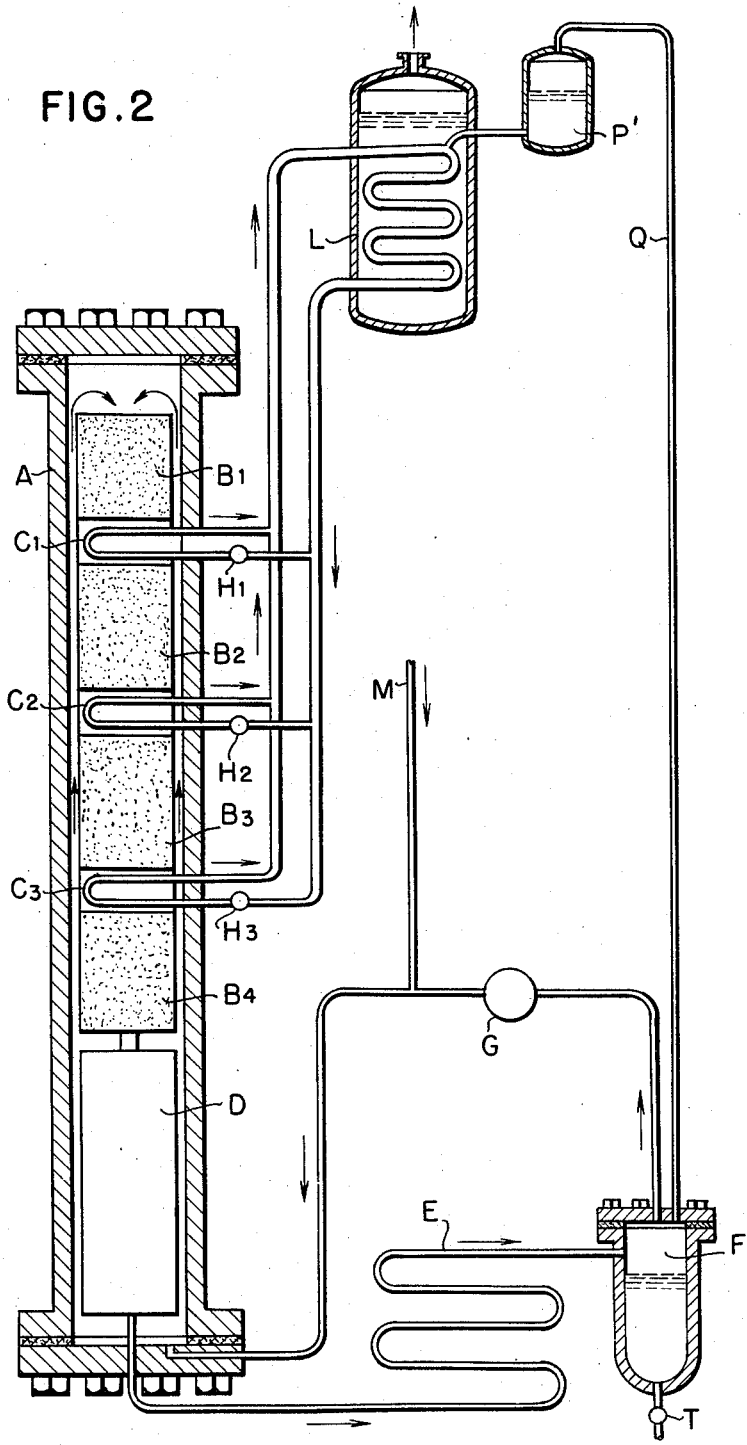

These and more specific objects, advantages and features of the invention will be apparent from the following description of the embodiments exemplified on the drawings in which Figs. 1 and 2 show schematically two different apparatus applied to ammonia synthesis. The same reference characters are used in both illustrations for respectively similar elements.

In the apparatus according to Fig. 1, a mixture of nitrogen and hydrogen under high pressure, such as 500 atm. or more, is supplied from a compressor conduit M. The mixture passes through a heat exchanger D in the lower part of a tubular reaction vessel or furnace A. From heat exchanger D the gas follows the upward path indicated by arrows and penetrates from the top into the catalysis chamber at a temperature sufficient to start the reaction, that is at a temperature of about 400° C. The catalyst mass is divided into several layers or beds $B_1$, $B_2$, $B_3$, $B_4$ supported by suitable gratings.

The gas leaves the first bed $B_1$ at a temperature of about 550° C. and passes through a cooling device $C_1$ formed by coils of special steel tubing. The device lowers the gas temperature to about 450° C.

The heat exchangers $C_1$, $C_2$, $C_3$ located intermediate the catalyst layers form part of a closed-cycle cooling system filled with liquid coolant, preferably water. A pump O in the cooling system secures a forced circulation of the water through the heat exchanger coil $C_1$. A valve $H_1$ connected in series with coil $C_1$ permits proportioning the volumetric flow quantity of the cooling water in accordance with the intensity of the heat developed by the reaction in the catalyst layer $B_1$. In an analogous manner, the temperature of the gas in the subsequent layers of the catalyst mass is adjusted so as to obtain the gradient of temperature best suited for optimum yield of the combination. After transferring part of their residual heat in the heat exchanger D to the inflowing cool gases, the catalyzed gases are cooled outside of vessel A in a cooler E. The condensed ammonia separates in a vessel F and is drained through a valve T. The gases that have not reacted are recycled by means of a pump G which forces them back into the synthesis vessel A together with a supply of new gases.

The steam produced at high pressure in the coils $C_1$, $C_2$ and $C_3$ is sent into the steam transformer I where steam is produced at lower pressure and the water of condensation is utilized in a closed cycle to prevent scale formation inside the pipes. The pump O for water circulation is actuated by an electric motor N placed with its axis vertical in the same vessel V that collects the condensed water. In this manner, high-pressure stuffing-box seals are obviated.

The pressure vessel V is divided by two heat-insulating baffle J into a bottom chamber for collecting the condensed coolant, an intermediate cooling chamber which is equipped with a cooler P supplied with coolant introduced through a pipe Y and removed through a funnel Y', and a top chamber filled with gas. The liquid coolant arriving from boiler I enters the bottom chamber as a liquid and also leaves that chamber through pump O in the liquid state. The intermediate space between the two partitions J communicates through a pipe Q with the conduit system for the synthesis gas and thus with the inside of the reactor A. As a result, the pressure in the collecting vessel V for the liquid coolant is substantially the same as the pressure obtaining within the reactor A as well as within the heat exchanger coils $C_1$, $C_2$, $C_3$ to which the liquid coolant is delivered by the pump O. The steam or vapor evolving from the liquid in the bottom chamber of vessel V is condensed in the intermediate cooling chamber by contact with the cooler P and returns to the bottom space through a pipe R. Thus the liquid is prevented from penetrating into the upper space of the vessel and from passing into the synthesis reaction circuit.

To improve the cooling of motor N and to more safely prevent the escape of coolant from vessel V into the synthesis gas conduit system, a portion of the compressed synthesis gas is passed through the upper portion of vessel V from pipe M through a branch pipe controlled by a valve S.

By virtue of the above-described pressure connection between the gas conduit system and the coolant cycle, any changes in gas pressure within the reactor are imparted to the coolant in the heat exchanger coils $C_1$, $C_2$, $C_3$. This reduces the stress imposed upon the heat-exchanger pipes even if operating at very high reaction pressures. Therefore, the tubing used in the heat exchangers $C_1$, $C_2$, $C_3$ and preferably made of corrosion resistant steel can be given much smaller wall thickness than otherwise needed, thus reducing the quantity made of this costly material while also permitting an operation at much higher synthesis pressures. The use of pipes of small wall thickness also affords reducing the space occupied by the coils and hence to save considerable cost for the entire catalysis furnace. While, in the past, it was extremely difficult to adjust the pressure within the cooling system so as to balance constantly and accurately the varying pressure inside the reactor, the present invention affords an automatic maintenance of pressure equalization without reliance upon pressure regulating means that require the application of pressure-tight stuffing boxes and similar sealing means traversed by removable parts. Nevertheless, and as explained, the invention avoids the possibility of coolant passing from the cooling system into the reaction chamber. This is important because in ammonia synthesis as well as in other reactions no water, steam or other cooling fluids must be permitted to pass from the cooling system into the reaction.

The apparatus illustrated in Fig. 2 is largely similar to that of Fig. 1. As described with reference to Fig. 1, the mixture of nitrogen and hydrogen supplied from a compressor outlet pipe M under high pressure passes through the heat exchanger D in the lower part of the synthesis tube A and thence along the path marked by arrows to enter from above into the first catalyst layer $B_1$ at a temperature, for instance about 400° C., sufficient for starting the reaction. The mixture then passes through the heat exchangers and catalyst beds $C_1$, $B_2$, $C_2$, $B_3$, $C_3$, $B_4$ and eventually through the heat exchanger D to a cooler E which discharges condensed ammonia into a collecting vessel F. The non-reacted gases are recycled through the reaction tube A by means of a pump G.

In contrast to Fig. 1, however, the forced circulation of cooling water through the heat exchangers $C_1$, $C_2$, $C_3$ is obtained by means of a thermosiphon system. That is, the water heated in the tubular coil of heat exchanger $C_1$ becomes specifically lighter and rises in the coolant system. The same effect occurs in the heat exchangers $C_2$, $C_3$. As a result, a thermosiphon circulation is produced. This circulation transfers the heat of reaction to the water contained in the steam boiler L. Respective valves $H_1$ to $H_3$ serve to proportion the flow of water in each heat exchanger in accordance with the intensity of reaction in the preceding layer of catalyst. In this manner the most favorable, decreasing thermal gradient needed for high yield can be adjusted.

The hot water coming from the thermosiphon circuit is collected in an expansion pot P'. Pot P' is connected by a pipe Q with the ammonia separator F. To prevent steam from penetrating into the synthesis circuit, the expansion pot P' is kept at a temperature below the critical point of the water in the coolant circulation system. By virtue of this device the water pressure in the cooling pipes $C_1$, $C_2$, $C_3$ is kept substantially equal to the pressure existing in the catalysis chamber A so that even if operating with very high synthesis pressures, it is possible to employ thin-walled pipes thus attaining the same savings and other advantages mentioned above with reference to Fig. 1. It will be apparent, however, that an apparatus according to Fig. 2 secures such advantages in a mechanically much simpler manner and with the aid of devices of utmost simplicity.

While in the foregoing reference is made to the use of water in the coolant circulating system it will be obvious that other liquid coolants may be used instead. It will further be appearent to those skilled in the art, upon a study of this disclosure, that the invention permits of various modifications and applications other than those specifically described, without departing from the essential features of the invention and within the scope of the claims annexed hereto.

I claim:

1. High-pressure apparatus for exothermic catalytic reactions, comprising a reaction vessel, a number of catalyst layers disposed one above the other in said vessel, heat exchanger tubes disposed between said respective layers for removing heat of reaction, a high-pressure gas conduit system extending through said vessel and serially including said layers for causing gaseous media to react in said vessel, a closed-cycle coolant circulation system comprising said heat exchanger tubes and also comprising a conduit portion outside said reaction vessel and in communication with said heat exchanger tubes, said circulation system containing a liquid coolant to be evaporated in said tubes, a cooling device disposed outside said reaction vessel in heat exchanging relation with the outside conduit portion of said coolant system for condensing the vaporous coolant, a pressure conduit connecting said coolant system at a point which is outside the reaction vessel and is ahead of the coolant intake of the heat exchanger tubes with said gas conduit system at a point ahead of said reaction vessel, and means preventing liquid coolant from passing through said pressure conduit, whereby the pressure in said heat exchanger tubes is kept substantially equal to the gas pressure in said reaction vessel.

2. High-pressure apparatus for exothermic catalytic reactions, comprising a reaction vessel, a number of catalyst layers disposed one above the other in said vessel, heat exchanger tubes disposed between said respective layers for removing heat of reaction, a high-pressure gas conduit system extending through said vessel and serially including said layers for causing gaseous media to react in said vessel, a closed-cycle coolant circulation system containing water, said coolant system including said heat exchanger tubes and also comprising a conduit portion outside said reaction vessel and in communication with said heat exchanger tubes, said circulation system having respecive flow control valves connected in series with said tubes, a steam boiler disposed outside said vessel in heat exchanging relation with the outside portion of said coolant system for producing steam due to the reaction heat carried off by the water in said coolant system, said coolant system having a water collecting vessel, and a pressure conduit through which said collecting vessel in said coolant system communicates with said gas conduit system whereby the pressure in said heat exchanger tubes is kept substantially equal to the gas pressure in said reaction vessel.

3. High-pressure apparatus for exothermic catalytic reactions, comprising a pressure vessel, a number of catalyst layers vertically stacked in said vessel, heat exchanger tubes disposed between said respective layers for removing heat of reaction, a high-pressure gas conduit system extending through said vessel and serially including said layers for causing gaseous media to react in said vessel, a closed-cycle thermosiphon coolant system comprising said heat exchanger tubes and also comprising a conduit portion outside said reaction vessel in communication with said heat exchanger tubes, a steam boiler disposed above said vessel in heat exchanging relation with the said outside portion of the coolant system for producing steam due to the reaction heat carried off by the coolant, a pressure conduit connected to the outside portion of the coolant system and through which said coolant system communicates with said gas conduit system whereby the pressure in said heat exchanger tubes is kept substantially equal to the gas pressure in said vessel, and means between said conduit and said coolant system for preventing the coolant in said coolant system from entering into said gas conduit system.

4. High-pressure apparatus for exothermic catalytic reactions, comprising a pressure vessel, a number of catalyst layers vertically stacked in said vessel, heat exchanger tubes disposed between said respective layers for removing heat of reaction, a high-pressure gas conduit system extending through said vessel and serially including said layers for causing gaseous media to react in said vessel, a closed-cycle thermosiphon coolant system containing water as the coolant and including said heat exchanger tubes and a communicating portion external to said pressure vessel means disposed above said heat exchanger tubes in heat exchanging relation with said external portion of the coolant system to remove the reaction heat carried off by the water, an expansion pot disposed above said coolant system and having a water-filled lower portion in communication with said coolant system and an upper portion above the water level, a pressure equalizing conduit connecting said upper portion with said gas conduit system for maintaining substantially equal pressures in said two systems, said heat exchanger tubes being connected in parallel relation to each other, and respective pressure control valves serially connected with said respective tubes and adjustable individually for securing a desired thermal graduation.

5. Pressure apparatus for an exothermic chemical transformation comprising a reaction vessel having a reaction chamber containing reaction gas under pressure, a heat exchanger in direct heat exchange relation with reaction gas in said chamber, liquid coolant in the exchanger, an external cooler, connecting means between the heat exchanger and the external cooler to circulate the liquid coolant therethrough, the exchanger, the cooler and the connecting means comprising a cooling system, means for maintaining a body of liquid coolant which means is connected to the external cooler, conduit means for applying the pressure of the reaction gas to a surface of the said body of liquid, and means connected to the said conduit means to separate coolant and prevent it from entering the reaction chamber.

6. The process of performing exothermic catalytic reactions under pressure in a reaction zone having catalyst containing regions and, intermediate said catalyst regions, heat exchange regions traversed by coolant, which comprises the steps of passing a flow of reaction gases serially through the catalyst containing regions and heat exchange regions whereby the evolving heat of reaction evaporates the coolant, cooling the vaporous coolant outside the reaction zone to condense it to the liquid state, returning the condensed coolant in a closed cycle to the heat exchange zones, and applying substantially the pressure of said reaction zone to the condensed coolant to maintain equalized pressures in the coolant cycle and in the reaction zone.

7. The process of performing exothermic catalytic reactions under pressure in a reaction zone having sequential catalyst containing regions and intermediate said catalyst regions heat exchange regions traversed by cooling water, which comprises the steps of passing a flow of reaction gases serially through the catalyst containing regions and heat exchange regions whereby the evolving heat of reaction converts the cooling water into high-pressure steam, applying the steam in heat-exchanging relation to a quantity of boiler water to convert it into low-pressure steam whereby the cooling water is cooled and condensed, returning the condensed water in a closed cycle to the heat exchange regions, and applying the pressure of said reaction gases to the condensed water for equalizing the pressures between the water cycle and the reaction gases.

8. The process of producing ammonia from a mixture of nitrogen and hydrogen in a reaction zone, which comprises the steps of passing the gaseous mixture serially through sequential catalyst containing regions and intermediate heat exchange regions, circulating a coolant through the heat exchange regions whereby coolant vapors evolve in the heat exchange regions, condensing the vaporous coolant outside of the reaction zone and cycling the condensed coolant back to the heat exchange regions, and applying the pressure of said mixture to the condensed coolant, whereby the coolant pressure in said heat exchange regions is substantially equal to the pressure of said mixture in said reaction zone.

9. Pressure apparatus for exothermic catalytic reactions, comprising a reaction vessel, a number of catalyst bodies disposed in said vessel, heat exchanger elements disposed between said respective bodies for removing heat of reaction, a high-pressure gas conduit system extending in and including said vessel and serially including said bodies for causing gaseous media to react in said vessel, a coolant circulation system including said heat exchanger elements and containing a liquid coolant to be evaporated in said elements, said coolant circulation system including a cooling device communicating with said heat exchanger elements and disposed outside said reaction vessel for condensing the vaporous coolant, a pressure conduit connecting said coolant system at a point located between said cooling device and the exchanger elements with said gas conduit system at a point ahead of said reaction vessel, and means preventing liquid coolant from passing through said pressure conduit, whereby the pressure in said heat exchanger elements is kept substantially equal to the gas pressure in said reaction vessel.

10. Pressure apparatus for exothermic catalytic reactions, comprising a reaction vessel, a number of catalyst bodies disposed in said vessel, heat exchanger elements disposed between said respective bodies for removing heat of reaction, a high-pressure gas conduit system extending in and including said vessel and serially including said bodies for causing gaseous media to react in said vessel, a coolant circulation system containing liquid and vapor thereof, said coolant system including said heat exchanger elements and a condenser connected to said heat exchanger elements, said condenser being connected to a liquid collecting vessel, and a pressure conduit through which said collecting vessel in said coolant system communicates with said gas conduit system whereby the pressure in said heat exchanger elements is kept substantially equal to the gas pressure in said reaction vessel.

11. Pressure apparatus for exothermic catalytic reactions, comprising a pressure vessel, a number of catalyst bodies in said vessel, heat exchanger conduits disposed between said respective layers for removing heat of reaction, a high-pressure gas conduit system extending in and including said vessel and serially including said bodies for causing gaseous media to react in said vessel, a recirculatory thermosiphon liquid coolant system comprising said heat exchanger conduits and further comprising a cooled conduit communicating with said heat exchanger conduits, a pressure conduit connected to said coolant system and through which said coolant system communicates with said gas conduit system whereby the pressure in said heat exchanger conduits corresponds to the gas pressure in said gas conduit system, and means between said conduit and said coolant system for preventing the liquid coolant in said coolant system from entering into said gas conduit system.

12. Pressure apparatus for exothermic catalytic reactions, comprising a pressure vessel, a number of catalyst layers vertically stacked in said vessel, heat exchanger tubes disposed between said respective layers for removing heat of reaction, a high-pressure gas conduit system extending through said vessel and serially including said layers for causing gaseous media to react in said vessel, a thermosiphon coolant conduit recirculatory system containing liquid as the coolant and comprising said heat exchanger tubes and also a conduit portion external to said pressure vessel, means disposed above said heat exchanger tubes in heat exchanging relation with said external conduit portion of the coolant system to remove the reaction heat carried off by the liquid, an expansion pot disposed above the communicating with said external conduit portion of the coolant system and having a temperature below the vaporization temperature of the liquid in said coolant system, said pot having a liquid-filled lower portion in communication with said coolant system and an upper portion above the liquid level, and a pressure conduit forming a communication between said gas conduit system and said upper portion of said expansion pot, whereby the pressure in said heat exchanger tubes corresponds to the gas pressure in said gas conduit system.

13. In the art of carrying out an exothermic chemical transformation under pressure, in which a reactant, or reactants, is passed through a reaction zone, and in which the reaction zone contains reaction gas under pressure, and wherein a liquid coolant recycling system is employed to carry off heat of chemical transformation, which system is at least partly in direct heat exchange relation with the reactants in the reaction zone and which system includes a collected body of said liquid coolant outside said reaction zone, the improvement comprising maintaining the pressure above the surface of said collected body of liquid in the liquid coolant system in correspondence with the pressure of the said reaction gas by applying the pressure of the reaction gas to the said surface of said body through a connecting passageway, the coolant being prevented from entering the reaction zone through the connecting passageway by a separation step.

14. High-pressure apparatus for exothermic catalytic reactions, comprising a reaction vessel, a number of catalyst layers disposed one above the other in said vessel, heat exchanger tubes disposed between said respective layers for removing heat of reaction, a high-pressure gas conduit system extending through said vessel and serially including said layers for causing gaseous media to react in said vessel, a closed-cycle coolant circulation system containing water, said coolant system including said heat exchanger tubes and also comprising a conduit portion outside said reaction vessel and in communication with said heat exchanger tubes, said circulation system having respective flow control valves connected in series with said tubes, a steam boiler disposed outside said vessel in heat exchanging relation with the outside portion of said coolant system for producing steam due to the reaction heat carried off by the water in said coolant system, said coolant system having a water collecting vessel, and a pressure conduit through which said collecting vessel in said coolant system communicates with said gas conduit system whereby the pressure in said heat exchanger tubes is kept substantially equal to the gas pressure in said reaction vessel, said collecting vessel being connected in said coolant circulation system between said steam boiler and said heat exchanger tubes, said collecting vessel having a lower portion filled with collected water and having an upper portion above the water level, said pressure conduit being in communication with said upper portion, a pump disposed in said lower portion for forcing the water through the coolant system, and an electric motor sealed in said collecting vessel and disposed in said upper portion in driving connection with said pump.

15. High-pressure apparatus for exothermic catalytic reactions, comprising a reaction vessel, a number of catalyst layers disposed one above the other in said vessel, heat exchanger tubes disposed between said respective layers for removing heat of reaction, a high-pressure gas conduit system extending through said vessel and serially including said layers for causing gaseous media to react in said vessel, a closed-cycle coolant circulation system containing water, said coolant system including said heat exchanger tubes and also comprising a conduit portion outside said reaction vessel and in communication with said heat exchanger tubes, said circulation system having respective flow control valves connected in series with said tubes, a steam boiler disposed outside said vessel in heat exchanging relation with the outside portion of said coolant system for producing steam due to the reaction heat carried off by the water in said coolant system, said coolant system having a water collecting vessel, and a pressure conduit through which said collecting vessel in said coolant system communicates with said gas conduit system whereby the pressure in said heat exchanger tubes is kept substantially equal to the gas pressure in said reaction vessel, said collecting vessel being connected in said coolant circulation system between said steam boiler and said heat exchanger tubes, said collecting vessel having a lower portion filled with collected water and having an upper portion above the water level, said lower portion being in communication with said boiler and also in communication with said heat exchanger tubes, said pressure conduit being in communication with said upper portion, and a controllable bypass conduit forming a communication between said upper portion and the gas inlet side of said gas conduit system.

16. Pressure apparatus for exothermic catalytic reactions, comprising a reaction vessel, a number of catalyst bodies disposed in said vessel, heat exchanger elements disposed between said respective bodies for removing heat of reaction, a high-pressure gas conduit system extending in and including said vessel and serially including said bodies for causing gaseous media to react in said vessel, a coolant circulation system containing liquid and vapor thereof, said coolant system including said heat exchanger elements and a condenser connected to said heat exchanger elements, said condenser being connected to a liquid collecting vessel, and a pressure conduit through which said collecting vessel in said coolant system communicates with said gas conduit system whereby the pressure in said heat exchanger elements is kept substantially equal to the gas pressure in said reaction vessel, said collecting vessel having a lower portion filled with collected water and having an upper portion above the water level, said pressure conduit being in communication with said upper portion, a pump disposed in said lower portion for forcing the water through the coolant system, and an electric motor sealed in said collecting vessel and disposed in said upper portion in driving connection with said pump.

17. In the art of carrying out an exothermic chemical transformation under pressure, in which a reactant, or reactants, is passed through a reaction zone, and in which the reaction zone contains reaction gas under pressure, and wherein a liquid coolant recycling system is employed to carry off heat of chemical transformation, which system is partly in direct heat exchange relation with the reactants in the reaction zone and partly external to the reaction zone, the improvement comprising maintaining the pressure above a surface of a body of liquid in the liquid coolant system externally of the reaction zone in correspondence with the pressure of the said reaction gas.

(References on following page)

References Cited in the file of this patent

UNITED STATES PATENTS

| | | |
|---|---|---|
| 1,159,865 | Pier | Nov. 9, 1915 |
| 1,592,772 | Bergius | July 13, 1926 |
| 1,689,684 | Reed | Oct. 30, 1928 |
| 2,209,346 | McCausland | July 30, 1940 |
| 2,281,527 | Simpson et al. | Apr. 28, 1942 |
| 2,371,381 | Campbell et al. | Mar. 13, 1945 |
| 2,438,467 | Tyson et al. | Mar. 23, 1948 |
| 2,512,586 | Stengel | June 20, 1950 |